(12) United States Patent
Mastro et al.

(10) Patent No.: US 11,415,062 B2
(45) Date of Patent: Aug. 16, 2022

(54) ROTATING SLEEVE CONTROLLING CLEARANCE OF SEAL ASSEMBLY OF GAS TURBINE ENGINE

(71) Applicant: Raytheon Technologies Corporation, Farmington, CT (US)

(72) Inventors: Jacob Peter Mastro, Glastonbury, CT (US); Kyle L. Forgette, West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/951,001

(22) Filed: Nov. 18, 2020

(65) Prior Publication Data
US 2022/0154648 A1 May 19, 2022

(51) Int. Cl.
| | | |
|---|---|---|
| *F02C 7/28* | (2006.01) | |
| *F02C 7/06* | (2006.01) | |
| *F01D 25/16* | (2006.01) | |
| *F04D 29/056* | (2006.01) | |
| *F01D 11/00* | (2006.01) | |

(52) U.S. Cl.
CPC .............. *F02C 7/28* (2013.01); *F01D 11/003* (2013.01); *F01D 25/16* (2013.01); *F02C 7/06* (2013.01); *F04D 29/056* (2013.01); *F05D 2240/50* (2013.01); *F05D 2240/56* (2013.01); *F05D 2240/60* (2013.01); *F05D 2260/30* (2013.01)

(58) Field of Classification Search
CPC ........ F01D 5/066; F01D 11/003; F01D 25/16; F02C 7/06; F02C 7/28; F04D 29/053; F04D 29/056; F04D 29/083; F04D 29/102; F05D 2240/50; F05D 2240/56; F05D 2240/60
See application file for complete search history.

(56) References Cited

U.S. PATENT DOCUMENTS

| | | | | |
|---|---|---|---|---|
| 4,222,708 A | * | 9/1980 | Davison | ................ F01D 25/243 403/4 |
| 4,541,775 A | | 9/1985 | Hovan | |
| 7,510,374 B2 | * | 3/2009 | Meacham | ............. F01D 25/162 415/229 |
| 7,878,756 B2 | | 2/2011 | Davis et al. | |
| 8,932,011 B2 | | 1/2015 | Mundell et al. | |
| 9,631,508 B2 | * | 4/2017 | Blais | ..................... F01D 11/003 |
| 10,190,429 B2 | | 1/2019 | Garrison | |
| 10,669,873 B2 | | 6/2020 | Valva et al. | |
| 2005/0013696 A1 | | 1/2005 | Le Jeune et al. | |
| 2011/0038718 A1 | | 2/2011 | Aschenbruck et al. | |
| 2019/0211877 A1 | * | 7/2019 | Amador | .................. F01D 5/066 |

* cited by examiner

*Primary Examiner* — Christopher R Legendre
(74) *Attorney, Agent, or Firm* — Carlson, Gaskey & Olds, P.C.

(57) ABSTRACT

A gas turbine engine includes, among other things, a bearing compartment, a shaft configured to rotate during operation of the gas turbine engine, and a sleeve configured to rotate with the shaft during operation of the gas turbine engine. The sleeve includes a variable radial dimension about a circumference of the sleeve. The engine further includes a seal statically mounted relative to the sleeve and configured to cooperate with the sleeve to seal the bearing compartment.

2 Claims, 3 Drawing Sheets

ROTATING SLEEVE CONTROLLING CLEARANCE OF SEAL ASSEMBLY OF GAS TURBINE ENGINE

BACKGROUND

A gas turbine engine typically includes a fan section, a compressor section, a combustor section, and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

A gas turbine engine also includes bearings that support rotatable shafts. The bearings require lubricant. Various seals near the rotating shafts contain oil within bearing compartments. During operation of the engine, the seals maintain compartment pressures and keep lubricating oil inside the various compartments.

SUMMARY

A gas turbine engine according to an exemplary aspect of the present disclosure includes, among other things, a bearing compartment, a shaft configured to rotate during operation of the gas turbine engine, and a sleeve configured to rotate with the shaft during operation of the gas turbine engine. The sleeve includes a variable radial dimension about a circumference of the sleeve. The engine further includes a seal statically mounted relative to the sleeve and configured to cooperate with the sleeve to seal the bearing compartment.

In a further non-limiting embodiment of the foregoing gas turbine engine, the sleeve includes a radially outer surface concentric with a center of the shaft.

In a further non-limiting embodiment of any of the foregoing gas turbine engines, the sleeve includes a radially inner surface having a center spaced-apart from the center of the radially outer surface of the sleeve.

In a further non-limiting embodiment of any of the foregoing gas turbine engines, the center of the shaft is spaced-apart from the center of the radially inner surface of the sleeve.

In a further non-limiting embodiment of any of the foregoing gas turbine engines, the gas turbine engine includes a bearing nut mounted directly to the shaft and configured to rotate with the shaft during operation of the gas turbine engine. Further, the sleeve is mounted to the bearing nut, and a minimum radial dimension of the sleeve is circumferentially aligned with a location of the bearing nut corresponding to a maximum deviation between the bearing nut and a reference axis.

In a further non-limiting embodiment of any of the foregoing gas turbine engines, the sleeve is arranged such that the center of the radially outer surface of the sleeve is concentric with a center of a radially inner surface of the seal.

In a further non-limiting embodiment of any of the foregoing gas turbine engines, the radially inner surface of the sleeve directly contacts a radially outer surface of the bearing nut.

In a further non-limiting embodiment of any of the foregoing gas turbine engines, the bearing nut includes a notch adjacent an aft surface thereof, and the sleeve is arranged in the notch such that the radially inner surface of the sleeve directly contacts a radially outer surface of the bearing nut.

In a further non-limiting embodiment of any of the foregoing gas turbine engines, the sleeve includes a plurality of projections projecting radially inwardly from the radially inner surface, the bearing nut includes a plurality of axially-extending projections defining slots therebetween, and the projections of the sleeve are received in a respective one of the slots of the bearing nut.

In a further non-limiting embodiment of any of the foregoing gas turbine engines, a retaining ring is mounted to the projections of the bearing nut to hold the projections of the sleeve within the slots.

In a further non-limiting embodiment of any of the foregoing gas turbine engines, the seal is a brush seal.

In a further non-limiting embodiment of any of the foregoing gas turbine engines, the sleeve includes a tab projecting radially outward of a radially outer surface of the sleeve, and the seal is aft of the tab.

In a further non-limiting embodiment of any of the foregoing gas turbine engines, the shaft is one of an inner shaft and an outer shaft of the gas turbine engine, and the shaft is rotatably supported by a bearing contained within the bearing compartment.

A method according to an exemplary aspect of the present disclosure includes, among other things, mounting a sleeve having a variable radial dimension relative to a shaft of a gas turbine engine such that the sleeve is configured to rotate with rotation of the shaft and such that a seal cooperates with the sleeve to establish a fluid boundary of a bearing compartment of the gas turbine engine.

In a further non-limiting embodiment of the foregoing method, the mounting step includes mounting the sleeve to the shaft via a bearing nut.

In a further non-limiting embodiment of any of the foregoing methods, the method includes determining a first circumferential location of the bearing nut corresponding to a maximum deviation between the bearing nut and a reference axis, and the mounting step includes aligning the sleeve relative to the bearing nut such that a second circumferential location corresponding to minimum radial dimension of the sleeve is circumferentially aligned with the first circumferential location.

In a further non-limiting embodiment of any of the foregoing methods, the mounting step is only performed if it is first determined that a center of the bearing nut is spaced-apart from a center of a radially inner surface of the seal.

In a further non-limiting embodiment of any of the foregoing methods, the mounting step includes arranging the sleeve such that a center of a radially outer surface of the sleeve is concentric with a center of a radially inner surface of the seal.

In a further non-limiting embodiment of any of the foregoing methods, the seal is a brush seal, the shaft is one of an inner shaft and an outer shaft of the gas turbine engine, and the shaft is rotatably supported by a bearing contained within the bearing compartment.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
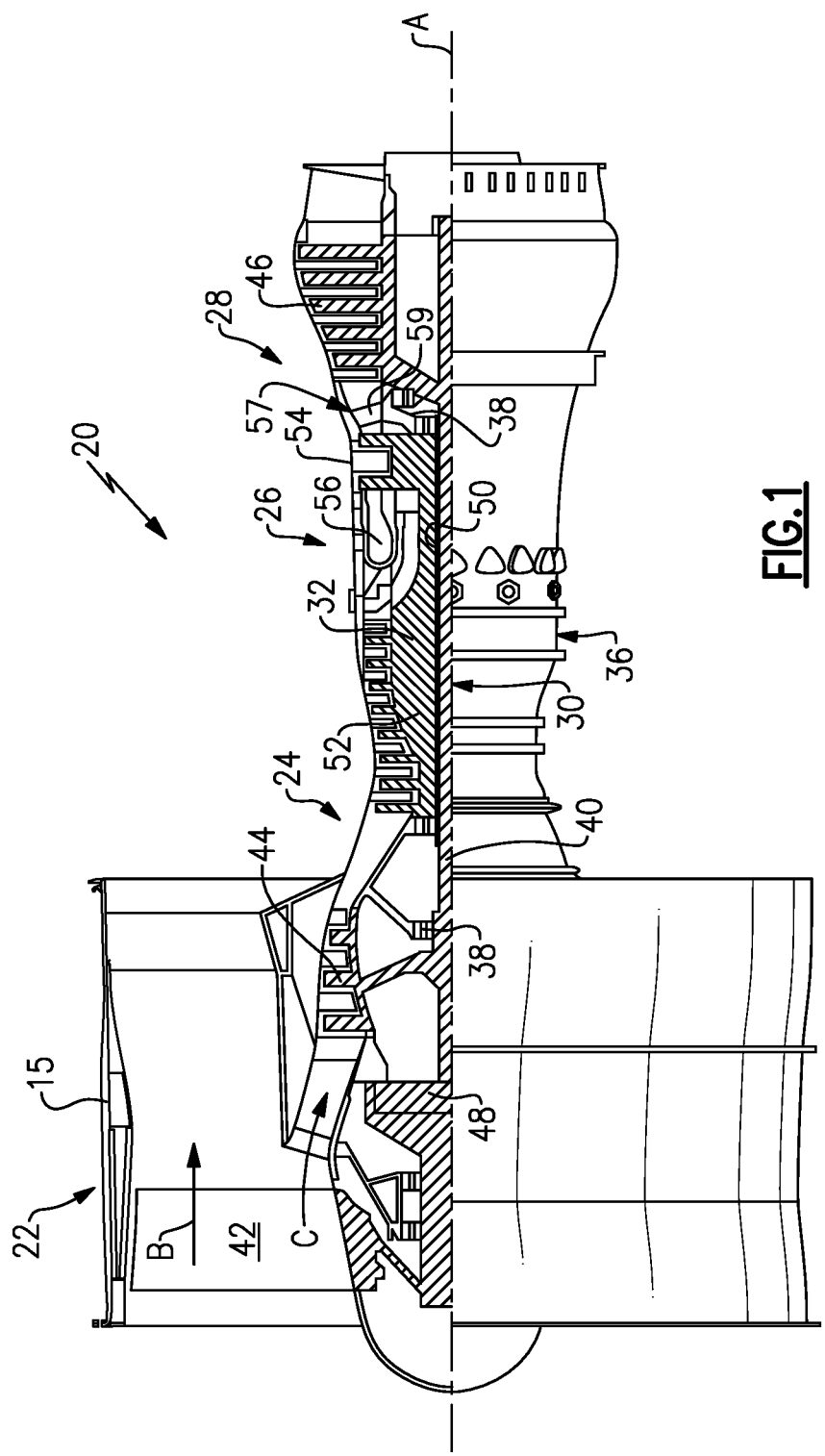
FIG. 1 schematically illustrates a gas turbine engine.

FIG. 1 schematically illustrates a gas turbine engine 20 ("engine 20"). The engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans, low bypass engines, and multi-stage fan engines.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ^\circ \text{ R})/(518.7^\circ \text{ R})]^{0.5}$. The "Low corrected fan tip speed" as disclosed herein according to one non-limiting embodiment is less than about 1150 ft/second (350.5 meters/second).

Figure 2:
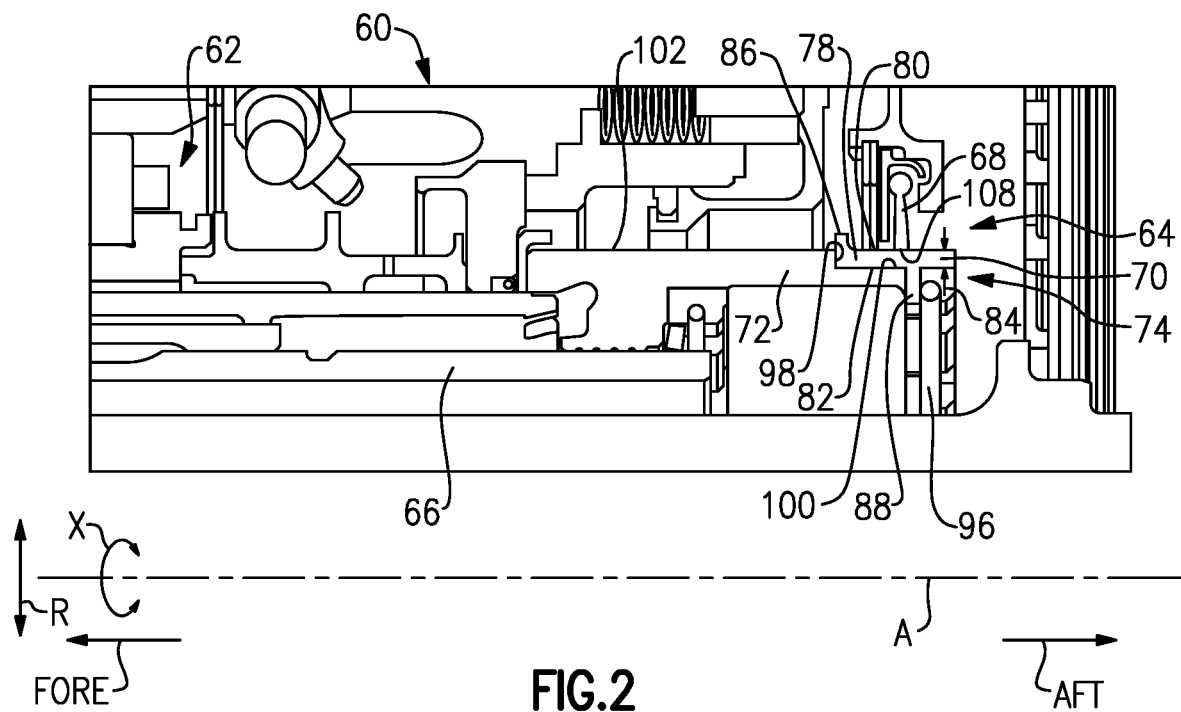
FIG. 2 illustrates a portion of the engine, and in particular illustrates a bearing compartment including a seal assembly.

FIG. 2 is a partial cross-sectional view of a bearing compartment 60 of the engine 20. The bearing compartment 60 includes a bearing assembly 62 and a seal assembly 64 configured to seal the bearing compartment 60 and maintain fluid pressure, particularly oil pressure, in the bearing compartment 60 during operation of the engine 20. As is known in the art, the bearing assembly 62 may include an inner race, an outer race, and rolling elements, such as balls, configured to roll therebetween. The bearing assembly 62 is mounted relative to a shaft 66 of the engine 20. The shaft 66 may be rotatably mounted such that the shaft 66 is configured to rotate generally about the engine central longitudinal axis A by one or more bearing assemblies, including additional bearing assemblies within the bearing compartment 60 or in other bearing compartments in the engine 20.

To this end, the bearing compartment 60 is representative of any bearing compartment within the engine 20. This disclosure is not limited to any specific bearing compartment, and in particular is not limited to a forward or an aft bearing compartment. The "fore" and "aft" directions are labeled for reference in FIG. 2. Further, the shaft 66 represents either the inner shaft 40 or the outer shaft 50. This disclosure is not limited to bearing compartments at any particular engine location, and this disclosure applies to compartments, other than bearing compartments, that are sealed.

The seal assembly 64 includes a seal 68 and a sleeve 70 configured to cooperate with one another to establish a seal for the bearing compartment 60, and in particular to keep oil in the bearing compartment 60, which, in turn, maintains oil pressure in the bearing compartment 60. In this example, the seal 68 is a brush seal. The seal 68 could be another type of seal such as a knife edge seal. The seal 68 is fixedly mounted to a static structure of the engine 20, and therefore does not rotate during operation of the engine 20. The seal 68 may be circumferentially segmented and may be made of a carbon (C) material, however other arrangements and materials come within the scope of this disclosure. For instance, the seal 68 could be provided by a single, continuous hoop extending, uninterrupted and without segmentation, about the engine central longitudinal axis A.

In this disclosure, the seal 68 can either directly contact the sleeve 70 or be arranged such that there is a radial gap G (FIG. 6) between the seal 68 and sleeve 70 during operation of the engine 20. In the latter example, the seal assembly 64 is known in the art as a non-contacting seal. In either case, the seal 68 and sleeve 70 are in a close relationship, and the relative spacing between the seal 68 and the sleeve 70 is important for maintaining pressure in the bearing compartment 60. The relative spacing between the seal 68 and the sleeve 70 may be referred to as the clearance of the seal assembly 64. The present disclosure seeks to control the clearance of the seal assembly 64 so as to provide a substantially uniform clearance about the entire circumference of the seal assembly 64, whether the seal assembly 64 is a contacting or non-contacting seal. As such, the present disclosure increases the performance of the seal assembly 64 and prolongs the useful life of the same.

In this disclosure, the sleeve 70 is mounted to the shaft 66 such that the sleeve 70 rotates during operation of the engine 20 relative to the seal 68 and other static components of the engine 20. In this regard, the sleeve 70 may be referred to as a rotating sleeve. The sleeve 70 is mounted to the shaft 66 via a bearing nut 72, in this example. The bearing nut 72 is engaged with the shaft 66 via a threaded connection and is configured to rotate with the shaft 66. This disclosure is not limited to threaded connections between the bearing nut 72 and the shaft 66. This disclosure also extends to sleeves directly mounted to the shaft 66 without an intermediate structure, such as the bearing nut 72.

The sleeve 70 is mounted such that the sleeve 70 is axially aligned (i.e., arranged at the same axial location, relative to the engine central longitudinal axis A) with the seal 68. The sleeve 70 is mounted adjacent an aft end 74 of the bearing nut 72, in this example. The sleeve 70 includes a main body portion 78 providing a radially outer surface 80, a radially inner surface 82, and a radial dimension 84 between the radially outer and inner surfaces 80, 82. The radial dimension 84 is the thickness of the main body portion 78 of the sleeve 70 in the radial direction R. In this disclosure, the radial dimension 84 is variable about a circumference of the sleeve 70 (i.e., in the circumferential direction X). In this disclosure, "axially" refers to a direction substantially parallel to the engine central longitudinal axis A, and "radially" refers to a direction substantially normal to the engine central longitudinal axis A (i.e., in the radial direction R). The term "circumferentially" is used herein to refer to angular positions and/or locations about a reference axis, such as the engine central longitudinal axis A (i.e., in the circumferential direction X).

Figure 3:
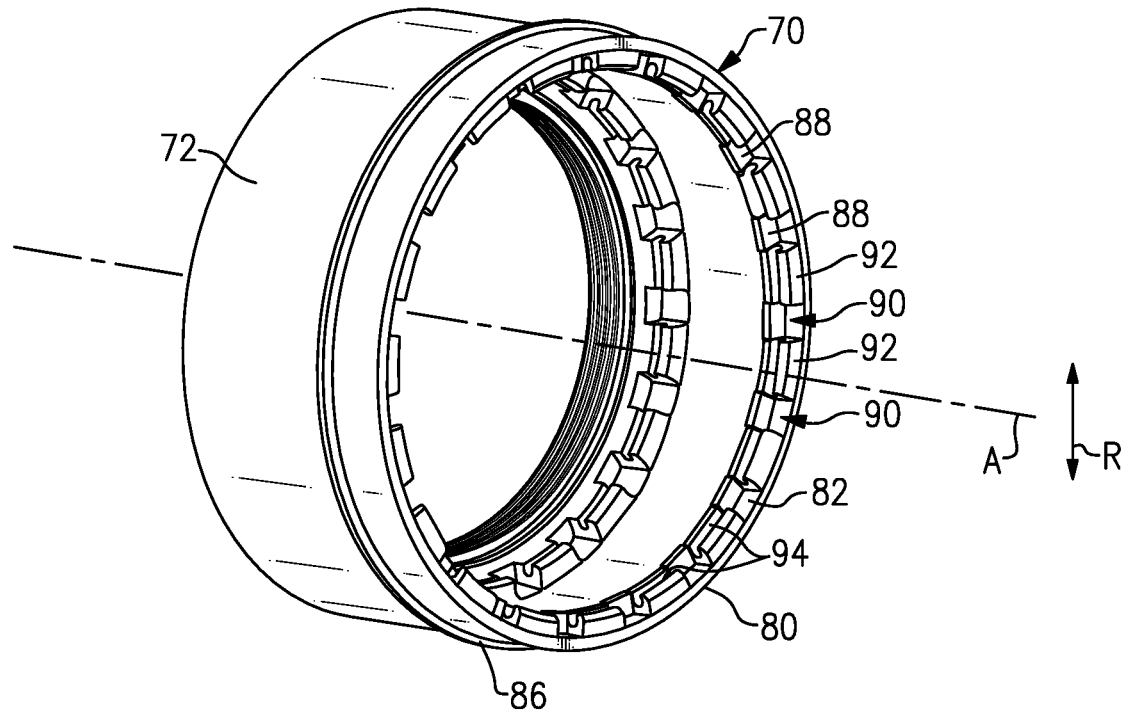
FIG. 3 is a perspective view of an example sleeve mounted relative to an example bearing nut.

As shown in FIGS. 2 and 3, the sleeve 70 may include a tab 86 projecting radially outward from the radially outer surface 80. The tab 86 is forward of the seal 68, in this example. Further, as shown in FIG. 3, the sleeve 70 is connected to the bearing nut 72 via a plurality of projections 88 which project radially inward of the radially inner surface 82. The projections 88 are circumferentially spaced-apart from one another such that each projection 88 fits in a slot 90 formed between adjacent axially-extending projections 92 of the bearing nut 72. A radially inner surface of the projections 92 may include a slot or groove 94 for receiving a retaining ring 96. The retaining ring 96 is radially aligned with the projections 88 and restricts axially aft movement of the sleeve 70 by holding the projections 88 in place within the slots 90.

In this example, the bearing nut 72 includes a notch 98 adjacent the aft end 74. In particular, the notch 98 is substantially L-shaped and is open facing an aft location and a radially outer location. The sleeve 70 is arranged in the notch 98 such the radially inner surface 82 of the sleeve 70 directly contacts a radially outer surface 100 of the bearing nut 72. Further, the notch 98 is sized such that the radially outer surface 80 of the sleeve 70 is radially aligned with an outermost radial surface 102 of the bearing nut 72. While a particular arrangement in which the sleeve 70 is mounted relative to the bearing nut 72 has been described, this disclosure extends to other arrangements.

Figure 4:
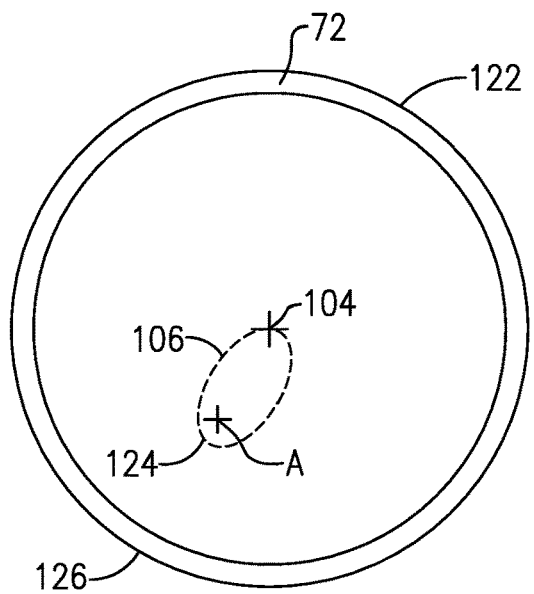
FIG. 4 is a somewhat schematic, end view of the example bearing nut.

During operation of the engine 20, the bearing nut 72 may rotate such that a center 104 of the bearing nut 72 is spaced-apart from a reference axis, namely the engine central longitudinal axis A, as schematically shown in FIG. 4. The reference axis may also correspond to center of the seal 68 in some examples. In certain situations, such as situations resulting from manufacturing tolerances or the effects of assembly, the center 104 of the bearing nut 72 is spaced-apart from engine central longitudinal axis A, about which the shaft 66 rotates, such that the bearing nut 72 follows a path 106 as the shaft 66 and bearing nut 72 rotate during operation of the engine 20. The path 106 is circular and exhibits a constant radius about the engine central longitudinal axis A, and may be referred to as a path of orbit.

In such situations in which the center 104 of the bearing nut 72 follows the path 106, during operation of the engine 20 there is an inconsistent radial distance between a radially inner surface 108 of the seal 68 and the radially outer surface 80 of the sleeve 70 about the circumference of the engine central longitudinal axis A. In this disclosure, the sleeve 70 is configured to provide consistent relative spacing between the radially inner surface 108 of the seal 68 and the radially outer surface 80 of the sleeve 70 such that the seal assembly 64 exhibits a consistent clearance despite the radial offset, and resulting orbit, of the bearing nut 72.

Figure 5:
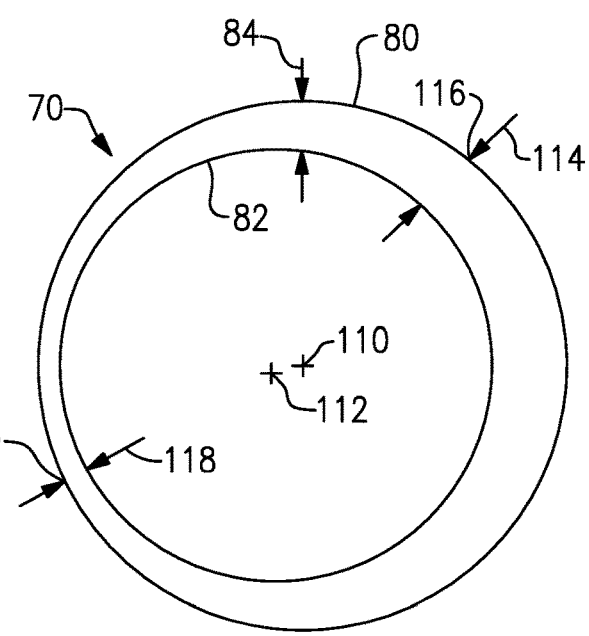
FIG. 5 is a somewhat schematic, end view of the example sleeve.

FIG. 5 is an end view of an example sleeve 70. As shown, the sleeve 70 includes a variable radial dimension 84 between the radially outer and inner surfaces 80, 82 about the circumference of the sleeve 70. The radially outer and inner surfaces 80, 82 are circular. Further, the center 110 of the radially outer surface 80 is spaced-apart from, and non-concentric with, the center 112 of the radially inner surface 82. The sleeve 70 thus includes a circular axial through-hole, defined within the radially inner surface 82, which is off-center, relative to the center 110 of the radially outer surface 80 of the sleeve 70.

The variable radial dimension 84 exhibits a maximum radial dimension 114 at a circumferential location 116 and exhibits a minimum radial dimension 118 at circumferential location 120, which is about 180° spaced-apart from the circumferential location 116. The variable radial dimension 84 gradually increases moving circumferentially from the circumferential location 120 to the circumferential location 116.

While a particular shape of the sleeve 70 has been described, other shapes come within the scope of this disclosure. Further, the sleeve 70 may come in a plurality of sizes and shapes. A worker, for example, may have access to a plurality of sleeves of varying sizes and shapes, and may be able to select an appropriate sleeve depending on the magnitude of orbit displayed by the bearing nut 72.

In an example, when mounting the sleeve 70 relative to the shaft 66 and bearing nut 72, a worker or machine first monitors the behavior of the bearing nut 72 to determine whether the bearing nut 72 is rotating off-center relative to the reference axis. In other words, a worker or machine determines whether the center 104 is spaced-apart from the engine central longitudinal axis A such that the center 104 follows a path 106 of orbit offset from the engine central longitudinal axis A. If the bearing nut 72 is not rotating off-center, the worker or machine may conclude that it is not appropriate to use a variable radial dimension sleeve relative to the rotating or static components of the seal assembly 64.

If, however, the center 104 is spaced-apart from the engine central longitudinal axis A such that the bearing nut 72 does orbit, the worker or machine may then determine a circumferential location on the bearing nut 72 corresponding to a maximum deviation of the bearing nut 72 from the reference axis. In FIG. 4, the circumferential location of the bearing nut 72 corresponding to that maximum deviation is labeled at 122 and follows a straight radially-extending line passing through the center 104 and the engine central longitudinal axis A. In other words, locations on the bearing nut 72 circumferentially spaced from location 122 are closer, following straight lines, to the engine central longitudinal axis A than the location 122.

Figure 6:
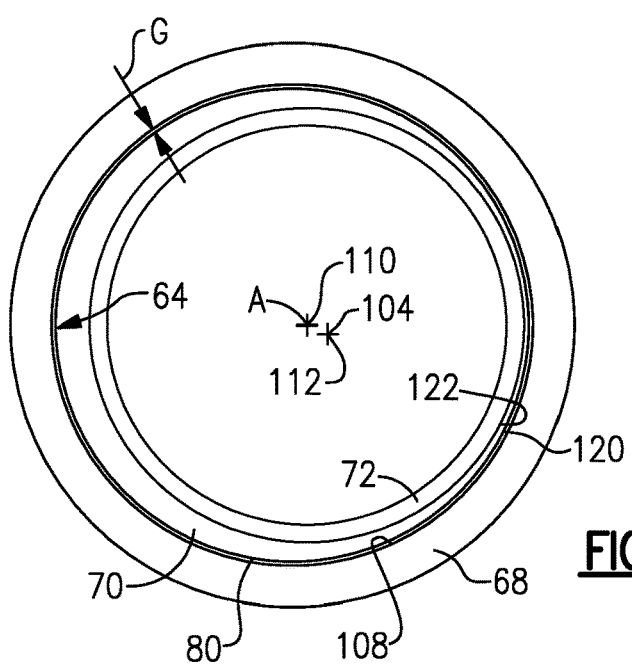
FIG. 6 is a somewhat schematic, end view of an example seal, the example sleeve, and the example bearing nut.

In order to provide a substantially constant gap G between the radially inner surface 108 of the seal 68 and the radially outer surface 80 of the sleeve 70 about the entire circumference of the seal assembly 64, the sleeve 70 is mounted relative to the bearing nut 72 such that location 120 is circumferentially aligned with location 122, as shown in FIG. 6. When mounted in this manner, the center 110 of the radially outer surface 80 is concentric with the center of the radially inner surface 108 of the seal 68. Further, in an example, the center 110 lies on the engine central longitudinal axis A. During operation of the engine 20, the center 104 follows the path 106, but the center 110 remains in a fixed, or substantially fixed, location, such as on the engine central longitudinal axis A. Thus, the variable radial dimension of the sleeve 70 compensates for the orbit of the bearing nut 72 to provide a substantially constant gap G about the entire circumference of the seal assembly 64.

The sleeve 70 could be mounted to the bearing nut 72 using additional and/or alternative other techniques. As one example, a worker or machine could monitor for a minimum deviation of the bearing nut 72 from the reference axis, and, in that case, the worker/machine would seek to circumferentially align location 126, corresponding to the circumferential location of the bearing nut 72 having the minimum deviation from the reference axis, with location 116 of the sleeve 70. The worker/machine could monitor for both the minimum and maximum bearing nut 72 deviations, and compare the locations of the center 110 and the center of the radially inner surface 108 of the seal 68 as checks to ensure proper mounting the sleeve 70 relative to the reference axis A. Regardless, once the relative orientations of the sleeve 70 and the bearing nut 72 are determined, the sleeve 70 is fixedly mounted relative to the bearing nut 72 so as to hold the relative positions of the components, such as by using the projections 88, slots 90, and the retaining ring 96 discussed above or using other techniques.

It should be understood that terms such as "axial," "radial," and "circumferential" are used above with reference to the normal operational attitude of the engine 20. Further, these terms have been used herein for purposes of explanation, and should not be considered otherwise limiting. Terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A gas turbine engine, comprising:
   a bearing compartment;
   a shaft configured to rotate during operation of the gas turbine engine;
   a sleeve configured to rotate with the shaft during operation of the gas turbine engine, wherein the sleeve includes a variable radial dimension about a circumference of the sleeve;
   a seal statically mounted relative to the sleeve and configured to cooperate with the sleeve to seal the bearing compartment,
   wherein the sleeve includes a radially outer surface concentric with the shaft,
   a bearing nut mounted directly to the shaft and configured to rotate with the shaft during operation of the gas turbine engine,
   wherein the sleeve is mounted to the bearing nut,
   wherein a minimum radial dimension of the sleeve is circumferentially aligned with a location of the bearing nut corresponding to a maximum deviation between the bearing nut and a reference axis,
   wherein a radially inner surface of the sleeve directly contacts a radially outer surface of the bearing nut,
   wherein the bearing nut includes a notch adjacent an aft surface thereof,
   wherein the sleeve is arranged in the notch such that the radially inner surface of the sleeve directly contacts the radially outer surface of the bearing nut, wherein the sleeve includes a plurality of projections projecting radially inwardly from the radially inner surface, wherein the bearing nut includes a plurality of axially-extending projections defining slots therebetween, and wherein each projection of the sleeve is received in a respective one of the slots of the bearing nut.

2. The gas turbine engine as recited in claim 1, wherein a retaining ring is mounted to the projections of the bearing nut to hold the projections of the sleeve within the slots.

* * * * *